(12) United States Patent
Giefer et al.

(10) Patent No.: US 6,708,581 B1
(45) Date of Patent: Mar. 23, 2004

(54) SHIFTING DEVICE FOR AN AUTOMATIC GEARBOX IN A MOTOR VEHICLE

(75) Inventors: Andreas Giefer, Lemförde (DE); Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 38 days.

(21) Appl. No.: 09/980,036
(22) PCT Filed: Mar. 27, 2001
(86) PCT No.: PCT/DE01/01154
§ 371 (c)(1),
(2), (4) Date: Nov. 27, 2001
(87) PCT Pub. No.: WO01/73320
PCT Pub. Date: Oct. 4, 2001

(30) Foreign Application Priority Data

Mar. 28, 2000 (DE) .......................................... 100 15 079

(51) Int. Cl.⁷ ................................................ B60K 20/00
(52) U.S. Cl. ................ 74/473.18; 74/473.2; 74/473.25; 74/473.12
(58) Field of Search .......................... 74/473.18, 473.2, 74/473.21, 437.24, 473.25, 473.33, 473.12, 473.27, 473.28, 473.3

(56) References Cited

U.S. PATENT DOCUMENTS

| 2,265,260 | A | * | 12/1941 | Argo | 137/635 |
|---|---|---|---|---|---|
| 3,768,329 | A | | 10/1973 | Comer, Jr. et al. | |
| 4,397,336 | A | * | 8/1983 | Godfrey | 136/636.2 |
| 4,519,266 | A | * | 5/1985 | Reinecke | 74/471 XY |
| 4,981,047 | A | * | 1/1991 | Denda et al. | 74/471 XY |
| 4,987,792 | A | * | 1/1991 | Mueller et al. | 74/473.12 |
| 5,339,705 | A | * | 8/1994 | Shirahama et al. | 74/473.27 |
| 5,622,079 | A | * | 4/1997 | Woeste et al. | 74/335 |
| 5,675,315 | A | * | 10/1997 | Issa et al. | 340/456 |
| 5,845,535 | A | | 12/1998 | Wakabayashi et al. | |
| 6,148,686 | A | * | 11/2000 | Kataumi | 74/473.18 |
| 6,155,128 | A | * | 12/2000 | Ersoy et al. | 74/473.12 |
| 6,386,061 | B1 | * | 5/2002 | Giefer | 74/473.18 |

FOREIGN PATENT DOCUMENTS

| DE | 44 26 207 C1 | 8/1995 |
|---|---|---|
| DE | 197 56 034 A1 | 7/1999 |
| EP | 0 575 658 A1 | 12/1993 |
| EP | 0 943 843 A2 | 9/1999 |
| WO | WO 00/03162 | 1/2000 |

* cited by examiner

Primary Examiner—David A. Bucci
Assistant Examiner—Bradley J. Van Pelt
(74) Attorney, Agent, or Firm—McGlew and Tuttle, P.C.

(57) ABSTRACT

A shifting device for transmitting shift commands to an automatic transmission of a motor vehicle is provided with a shifting device body or housing, a selector axis and a said shift axis, which are arranged at right angles to one another, and with a gearshift lever. The gear shift lever is mounted pivotably in relation to its neutral position within at least one outer right-hand shift gate and an outer left-hand shift gate. A device for transmitting shift commands based on a movement of the gearshift lever to the automatic transmission is also provided. At least two separate locking levers are provided, pivotable around an auxiliary axis each, which is a rigid part of the housing. The at least two separate locking levers can be engaged by the gearshift lever indirectly or directly.

16 Claims, 12 Drawing Sheets

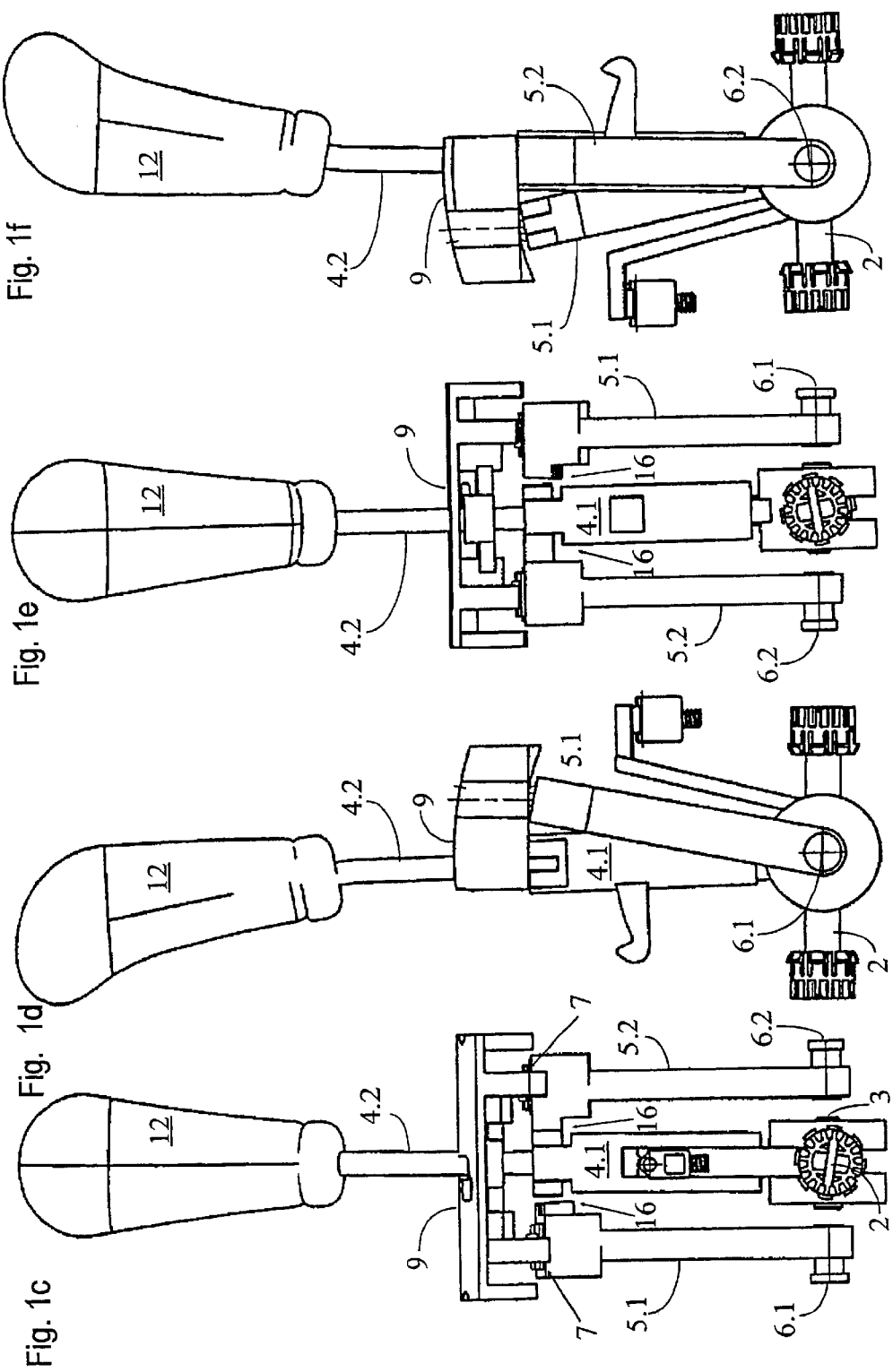

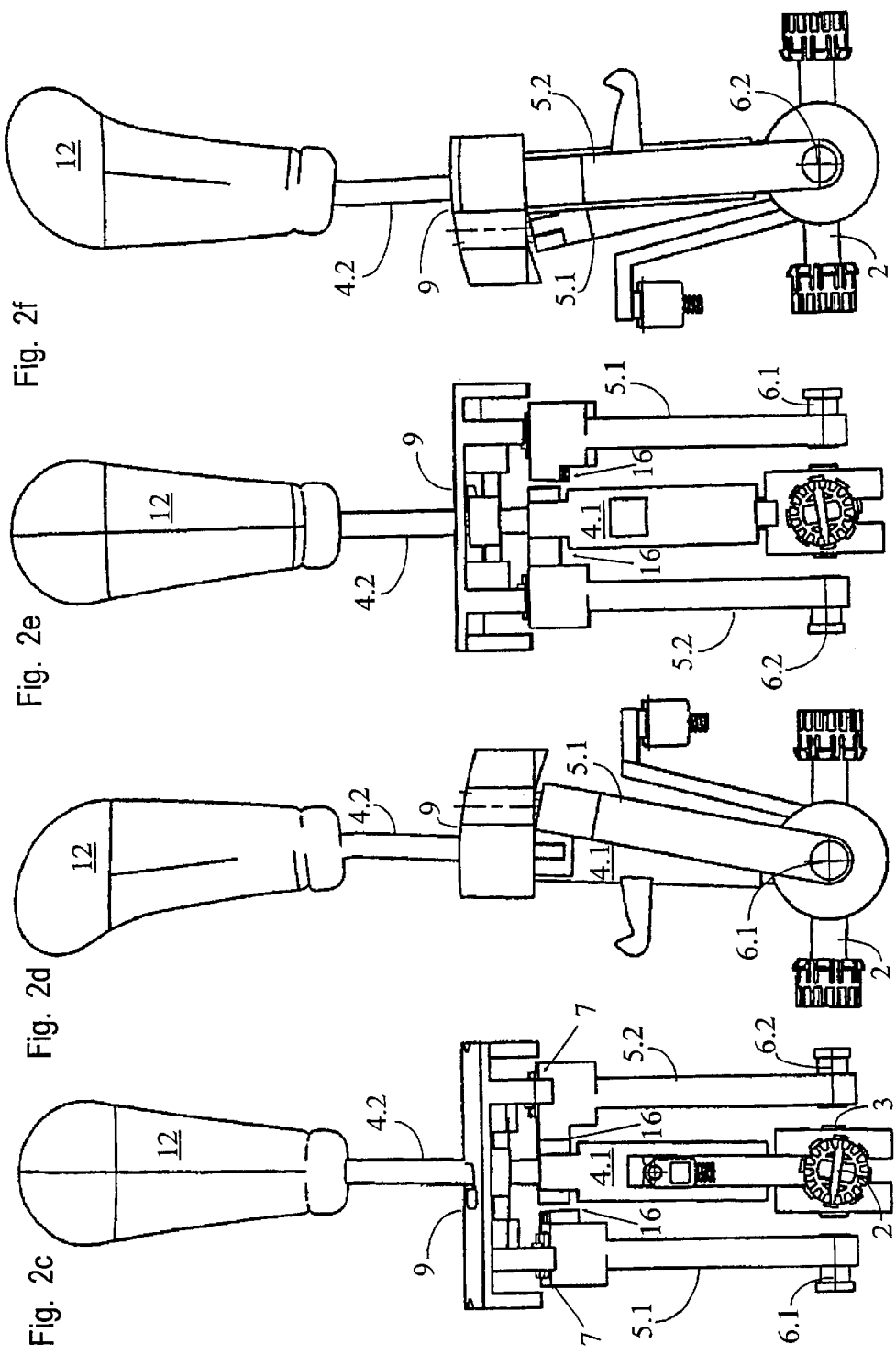

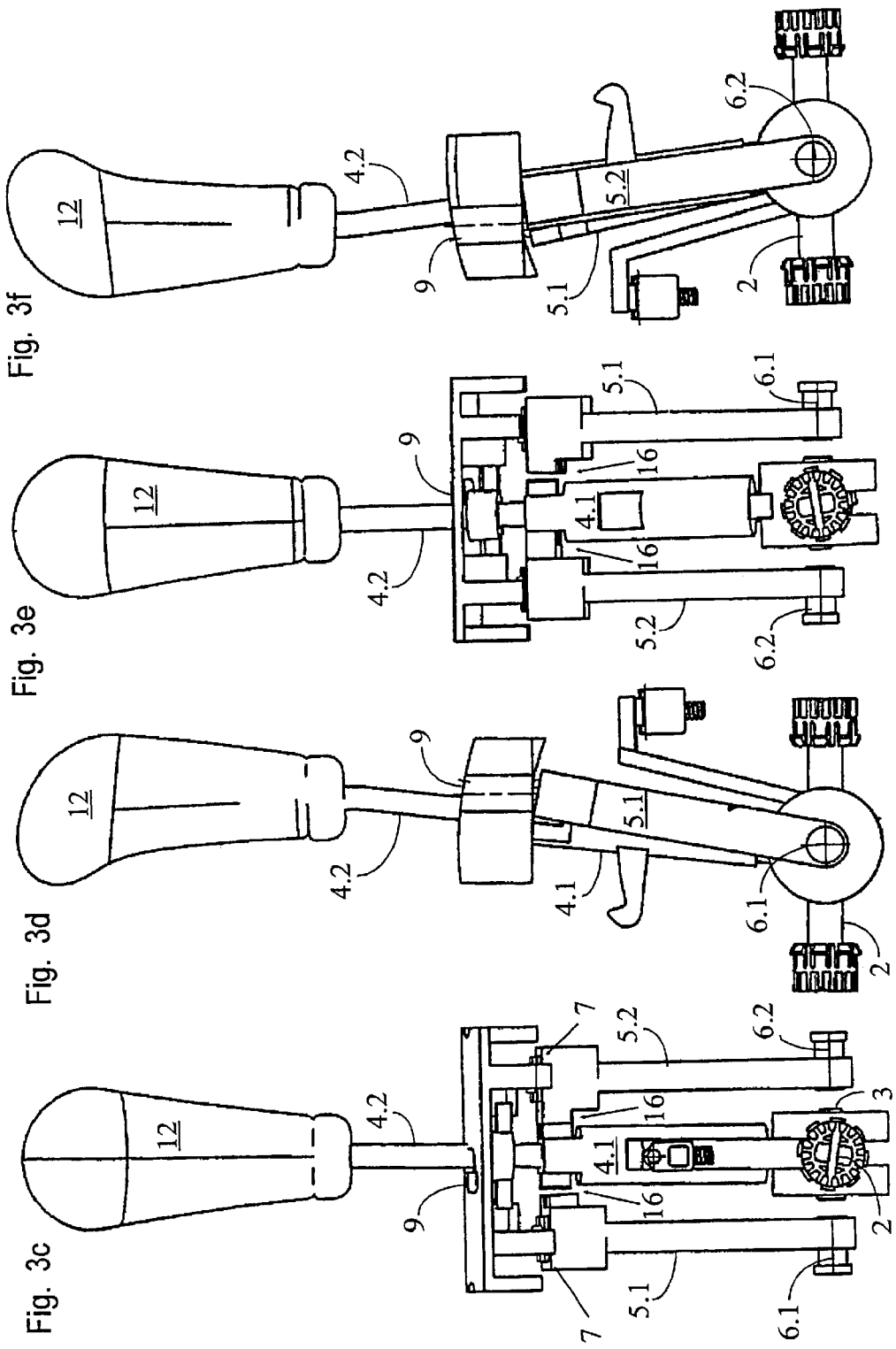

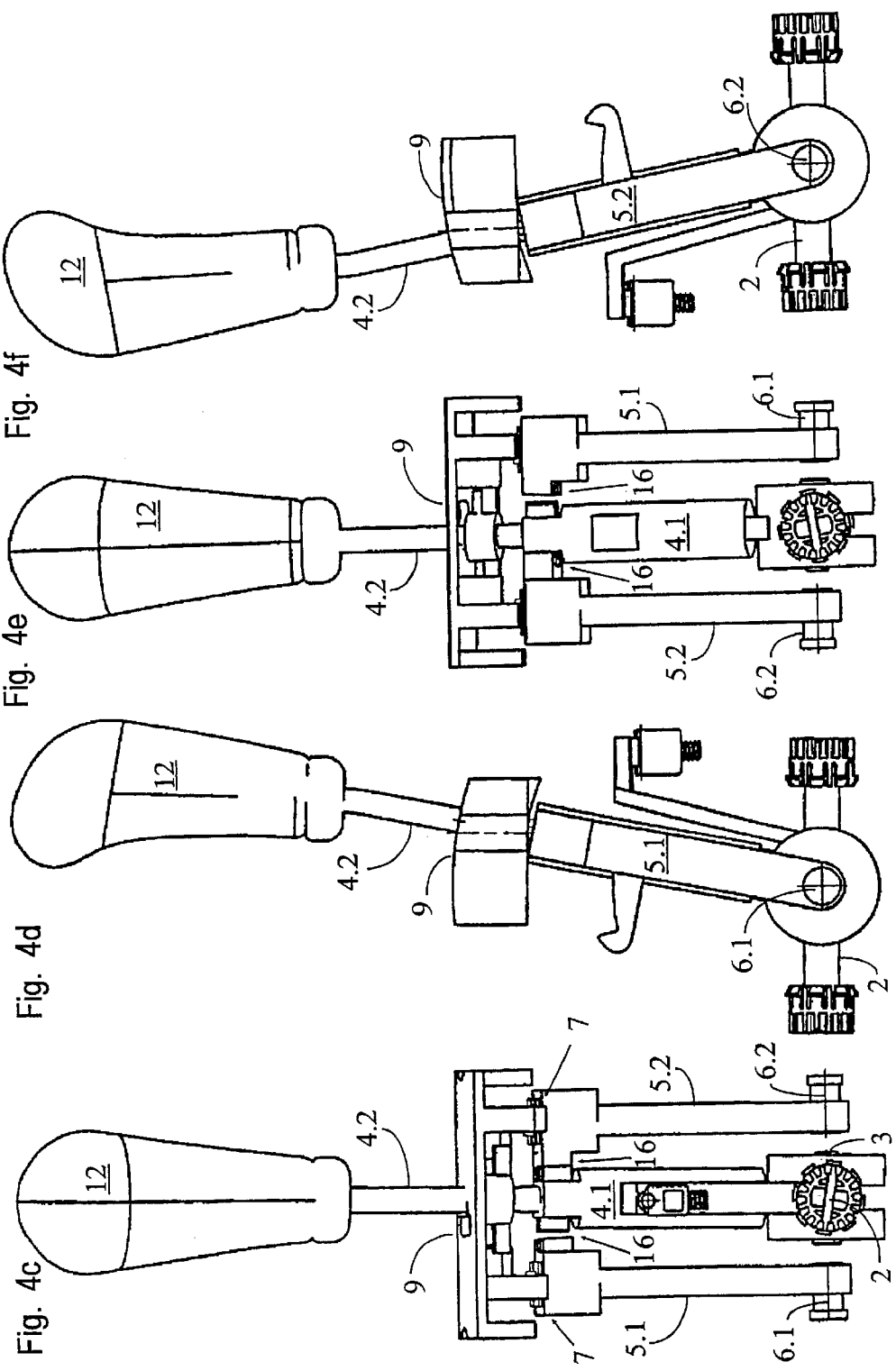

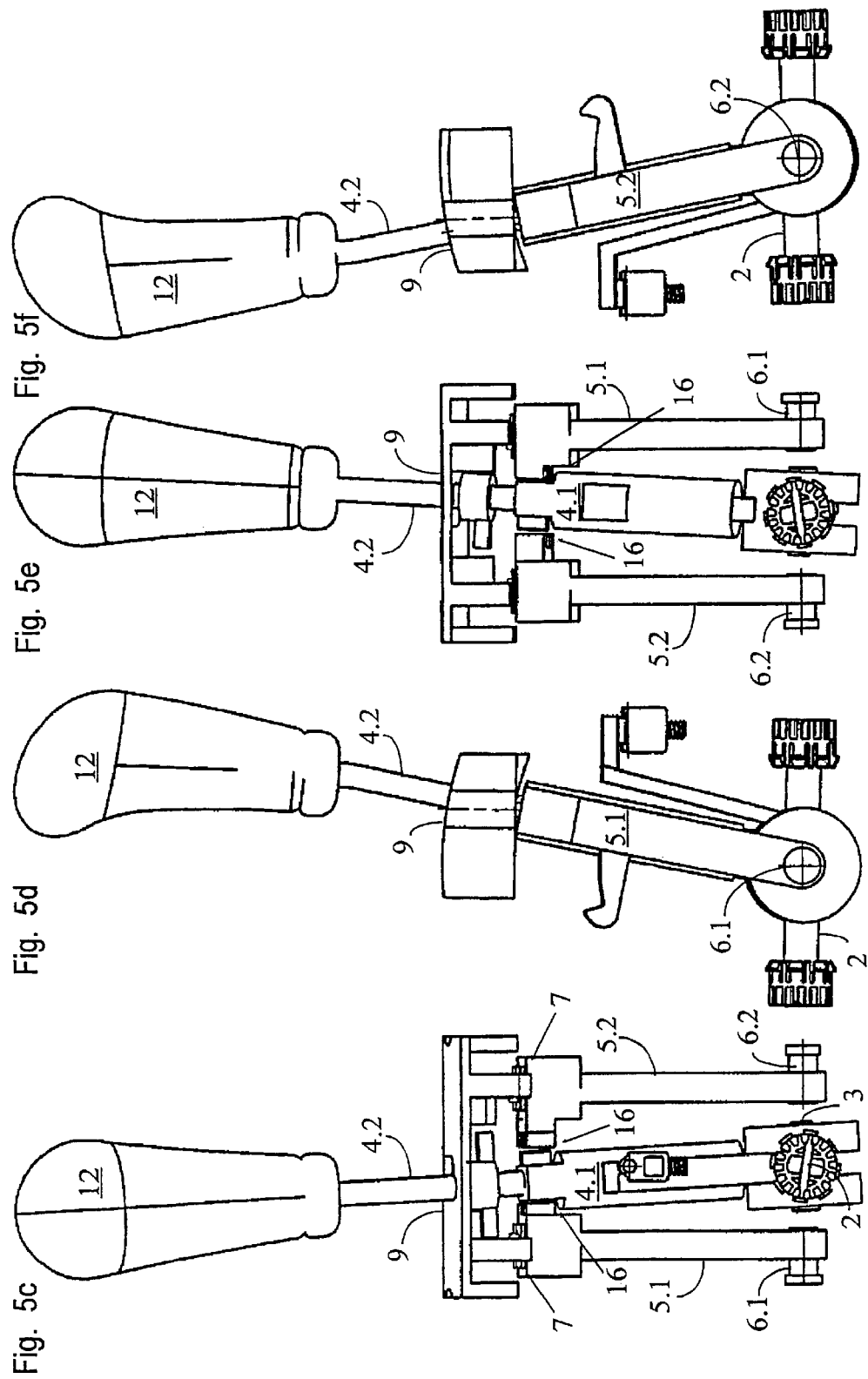

SHIFTING DEVICE FOR AN AUTOMATIC GEARBOX IN A MOTOR VEHICLE

FIELD OF THE INVENTION

The present invention pertains to a shifting device for transmitting shift commands to an automatic transmission of a motor vehicle, with a housing, with a selector axis and with a shifting axis, which are arranged at right angles to one another, with a gearshift lever, which is mounted pivotably in relation to its neutral position in at least one outer right-hand shift gate and an outer left-hand shift gate, and with a means for transmitting shift commands based on a movement of the gearshift lever to the automatic transmission.

BACKGROUND OF THE INVENTION

A similar shifting device has been known from the patent application DE 197 56 034 A1. This discloses a shifting device for an automatic transmission of a motor vehicle, which shifting device makes possible the powerless transmission of shift commands to an automatic transmission of a motor vehicle. This shifting device has a housing, a gearshift lever mounted pivotably around two axes in two shift gates, a detection device for detecting the position of the gearshift lever, and a transmission device for the shift commands to the automatic transmission.

One problem of this prior-art shifting device is the highly specific and complicated design, because it must be designed in two different mirror symmetrical variants in relation to one another depending on whether the vehicle is designed as a vehicle with the steering wheel on the right or as a vehicle with the steering wheel on the left. Such variants lead to small lots and consequently to unfavorably high production costs and logistic problems.

SUMMARY AND OBJECTS OF THE INVENTION

The object of the present invention is to provide a shifting device for transmitting shift commands to an automatic transmission of a motor vehicle, which shifting device makes it possible, on the one hand, to be used in both vehicles with the steering wheel on the right and in vehicles with the steering wheel on the left, using identical components, and, on the other hand, to reach low production costs by manufacturing large lots of a small number of components for different requirements and to eliminate at the same time a complicated logistics which arises from the large number of different shifting devices for different vehicles.

According to the invention, a shifting device for transmitting shift commands to an automatic transmission of a motor vehicle is provided with a housing, a selector axis and a said shift axis, which are arranged at right angles to one another, and with a gearshift lever. The gear shift lever is mounted pivotably in relation to its neutral position within at least one outer right-hand shift gate and an outer left-hand shift gate. A device for transmitting shift commands based on a movement of the gearshift lever to the automatic transmission is also provided. At least two separate locking levers are provided, pivotable around an auxiliary axis each, which is a rigid part of the housing. The at least two separate locking levers can be engaged by the gearshift lever indirectly or directly.

It is accordingly proposed that a prior-art shifting device for transmitting shift commands to an automatic transmission of a motor vehicle, which shifting device has a housing, a selector axis and a shift axis, which are arranged at right angles to one another, and a gearshift lever mounted pivotably in relation to a neutral position in at least one outer right-hand shift gate and an outer left-hand shift gate and a means for transmitting shift commands based on a movement of the gearshift lever to the automatic transmission, be improved. This is provided according to the invention with at least two separate locking levers, which are arranged laterally and are pivotable around an auxiliary axis each which is a rigid part of the housing, so that the gearshift lever can indirectly or directly engage the locking levers. As a result, a simple design of the shifting device is achieved, which makes it possible to use this shifting device using identical components for shifting devices for different vehicles. In addition, large lots of identical components can be obtained for shifting devices of different vehicles, and the necessary logistics is also simplified, in addition.

It may be advantageous for the greatest possible symmetry of the components of the shifting device for the shift axis and the selector axis to be located in one plane.

To prevent needless friction at engagement points, it is, furthermore, advantageous for the auxiliary axes of the locking levers to be arranged such that the locking levers and the gearshift lever are pivotable around a common axis line at least within one shift gate.

Furthermore, the locking levers may advantageously extend opposite their auxiliary axes in a guide that is a rigid part of the housing, so that no excessively strong leverages act on the mounting of the locking levers and the latter can have a simpler design as a result.

If the shifting device is designed for the powerless transmission of shift commands ("shift by wire" shifting), the means for transmitting shift commands may have at least two carriers for detectors for the gearshift lever position, wherein two fastening devices are provided for the two carriers such that both carriers can be fastened mutually in a functioning manner on both fastening devices. The shifting device can be used in this manner for vehicles with the steering wheel on the left and for vehicles with the steering wheel on the right by replacing the carriers.

The two fastening devices and/or the two carriers may advantageously have an identical design concerning their fastening points and/or the two carriers. In addition, the carriers and the fastening devices for the carriers may be designed such that they can be clipped on, plugged on or screwed on.

If the most compact design possible and a simple manufacturing process shall be achieved, the carriers may be designed as printed circuit boards with detectors and optionally an operating electronic unit for the detectors for the transmission of the shift commands, which said detectors and optional operating electronic unit are fastened to the said printed circuit board.

A gear shifting gate, which predetermines the shifting paths, may be used to guide the gearshift lever in the shift gates. It is again particularly advantageous for the gear shifting gate, which is introduced, e.g., into the cover of the housing, to be designed such that it can be fastened to the shifting device in two positions offset by 180°. Thus, a single gear shifting gate can be used for both vehicles with the steering wheel on the left and vehicles with the steering wheel on the right.

If the gearshift lever has a two-part design, where a first part is mounted pivotably around the two axes, and a second part is connected to the first part detachably, preferably by means of a plug-type or screw connection, the same shifting device may also be used in vehicles in which the relative position of the shifting device in relation to the driver's seat is different by a simple replacement of the detachable parts of the gearshift lever. The use of such a shifting device in both a passenger car and a truck shall be mentioned as an example for this. A longer second part of the gearshift lever is replaced here with a short part for the truck only, so that a necessarily higher position of the shift knob is obtained in the truck.

For a pleasant feeling of shifting and for positioning the gearshift lever in different shift positions in the case of a powerless transmission of the shift commands, the two locking levers may be in contact with a locking device with a spring-loaded ball or roller each.

An advantageous embodiment of the locking device may be an embodiment in which the locking device are arranged on separate, replaceable blocks and holding devices which are rigid parts of the housing are provided for the blocks. Extensive modularity of the shifting device is also achieved as a result of this, and it makes it possible to adapt the shifting device to different requirements in a simple manner. For example, the same shifting device can be used simply for a four-gear or five-gear transmission by replacing the blocks and optionally the sensor system.

Provisions are made in an advantageous embodiment of the blocks for the replaceable blocks also to have the guiding function of the locking levers. Furthermore, the replaceable blocks and the holding devices which are a rigid part of the housing may also be designed for this purpose such that the blocks can be mutually replaced.

To simplify the production, it is, furthermore, useful for the two locking levers to have an identical shape.

If the shifting device is used in connection with the transmission of the shift command via a cable, either directly to a transmission or for actuating a sensor system arranged remotely, at least one locking lever may have an attachment for a cable, which is preferably designed such that the cable can be fastened in two layers running in opposite directions.

Further features and advantages of the present invention appear from the subclaims and the following description of a preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1c is a rear view of the shifting device with the gearshift lever in the parking position;

FIG. 1d is a left side view of the shifting device with the gearshift lever in the parking position;

FIG. 1e is a front view of the shifting device with the gearshift lever in the parking position;

FIG. 1f is a right side view of the shifting device with the gearshift lever in the parking position;

FIG. 2c is a rear view of the shifting device with the gearshift lever in the neutral position;

FIG. 2d is a left side view of the shifting device with the gearshift lever in the neutral position;

FIG. 2e is a front view of the shifting device with the gearshift lever in the neutral position;

FIG. 2f is a right side view of the shifting device with the gearshift lever in the neutral position;

FIG. 3c is a rear view of the shifting device with the gearshift lever in the automatic shift gate in the R position;

FIG. 3d is a left side view of the shifting device with the gearshift lever in the automatic shift gate in the R position;

FIG. 3e is a front view of the shifting device with the gearshift lever in the automatic shift gate in the R position;

FIG. 3f is a right side view of the shifting device with the gearshift lever in the automatic shift gate in the R position;

FIG. 4c is a rear view of the shifting device with the in the gearshift lever automatic shift gate in the drive position;

FIG. 4d is a left side view of the shifting device with the gearshift lever in the automatic shift gate in the drive position;

FIG. 4e is a front view of the shifting device with the gearshift lever in the automatic shift gate in the drive position;

FIG. 4f is a right side view of the shifting device with the gearshift lever in the automatic shift gate in the drive position;

FIG. 5c is a rear view of the shifting device with the gearshift lever in the middle position in the sequential shift gate;

FIG. 5d is a left side view of the shifting device with the gearshift lever in the middle position in the sequential shift gate;

FIG. 5e is a front view of the shifting device with the gearshift lever in the middle position in the sequential shift gate;

FIG. 5f is a right side view of the shifting device with the gearshift lever in the middle position in the sequential shift gate;

DESCRIPTION OF THE PREFERRED EMBODIMENT

Figure 1B:
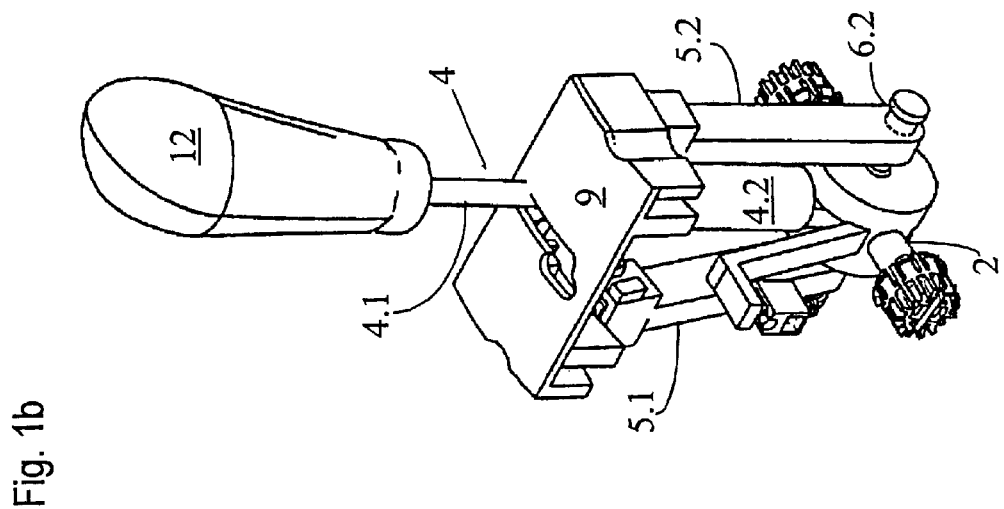
FIG. 1b is a perspective view of the shifting device with the gearshift lever in the parking position.

Referring to the drawings in particular, FIG. sets 1a–1f through 5a–5f show the shifting device according to the present invention in six different views, the five individual figure sets differing by five different positions of the gearshift lever.

FIGS. 1a, 2a, 3a, 4a and 5a show a top view of the shifting device 1 according to the present invention. For greater clarity, the views which correspond to the FIGURES with the same ending letters in the figure sets are indicated with arrows and with the associated characters b through f.

The shifting device 1 has a shift knob 12, a gearshift lever 4, which is not visible in the top view and which extends in a gear shifting gate 9, and an automatic shift gate on the right side and a sequential shift gate for the sequential shifting of the automatic transmission on the left side.

Figure 1A:
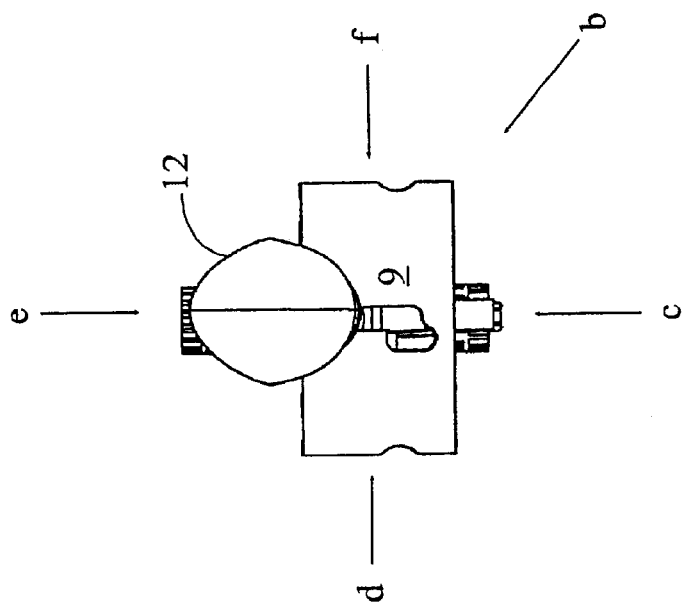
FIG. 1a is a top view of the shifting device with the gearshift lever in the parking position.
Figure 2B:
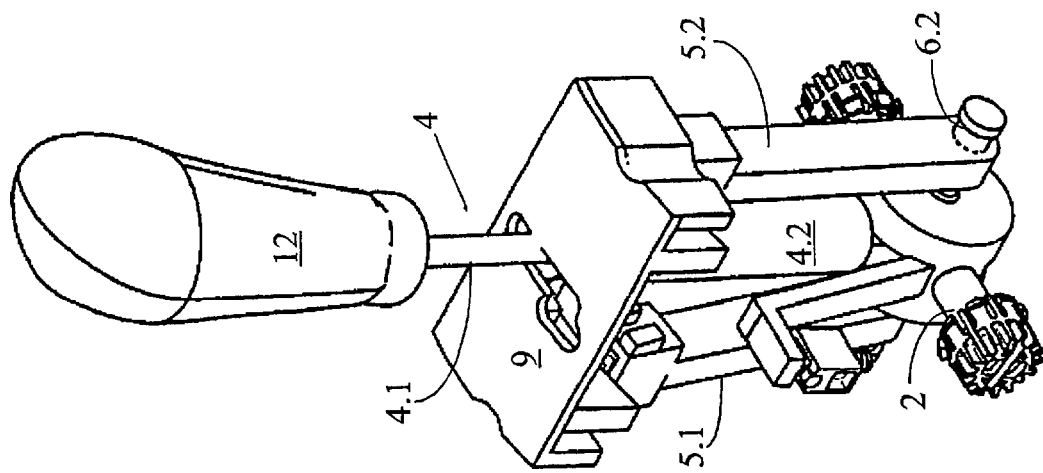
FIG. 2b is a perspective view of the shifting device with the gearshift lever in the neutral position.
Figure 2A:
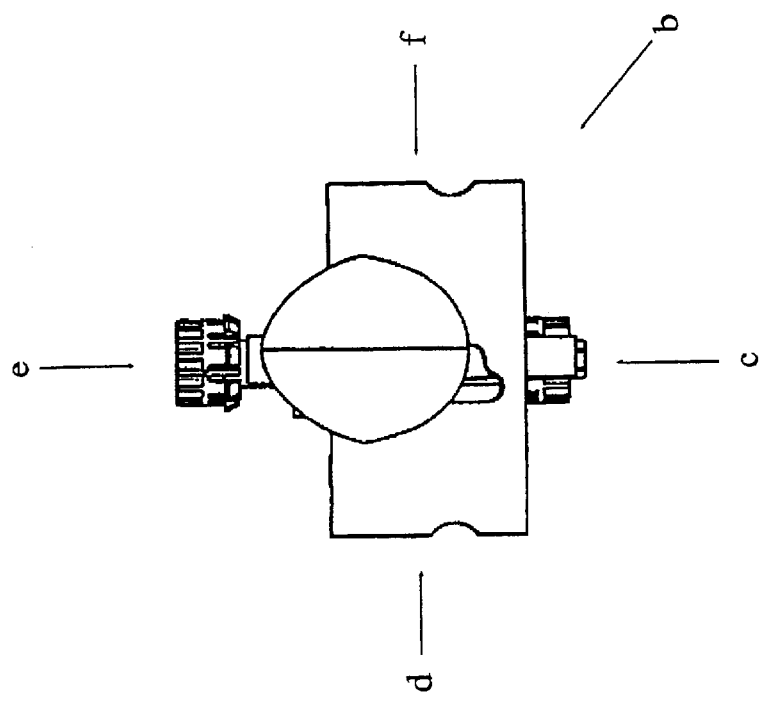
FIG. 2a is a top view of the shifting device with the gearshift lever in the neutral position.
Figure 3B:
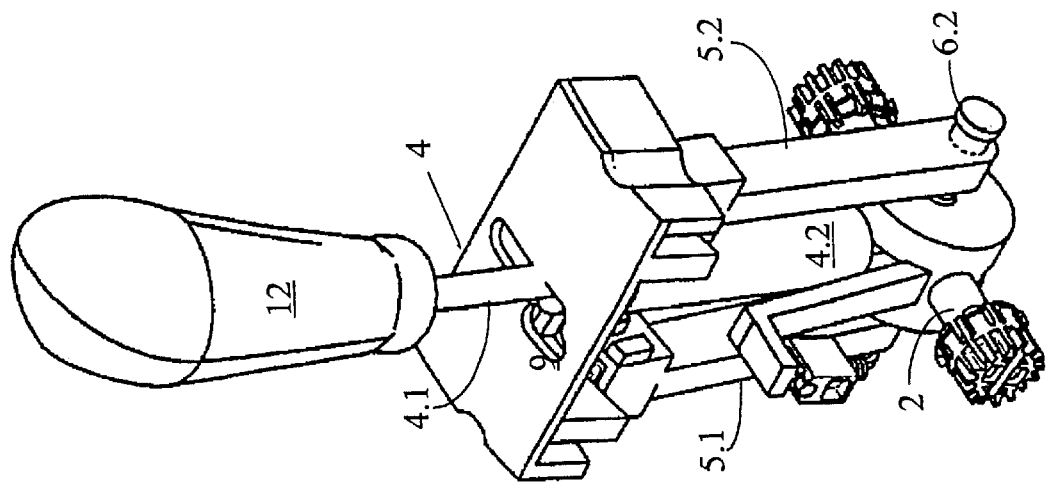
FIG. 3b is a perspective view of the shifting device with the gearshift lever in the automatic shift gate in the R position.
Figure 3A:
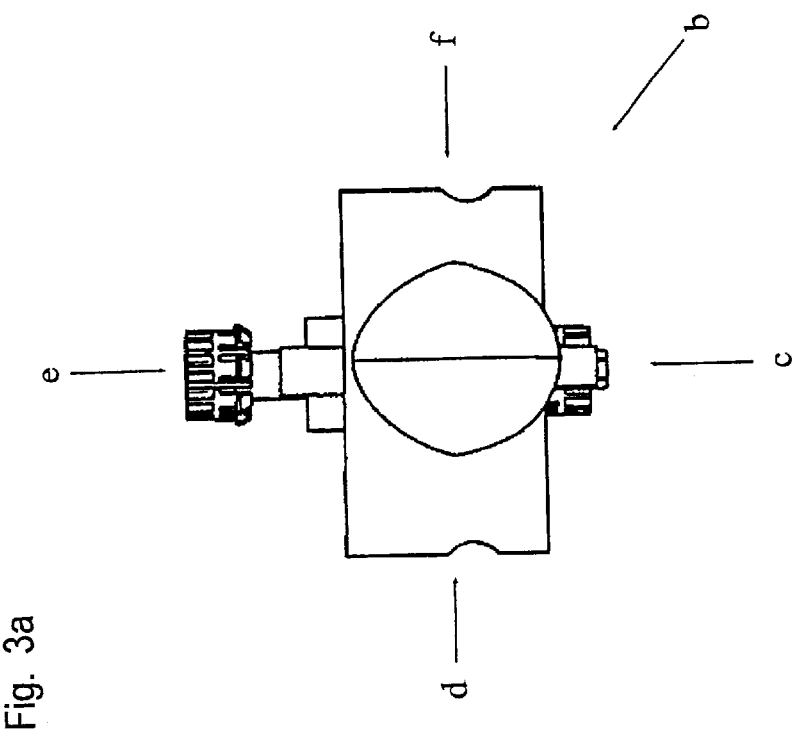
FIG. 3a is a top view of the shifting device with the gearshift lever in the automatic shift gate in the R position.
Figure 4B:
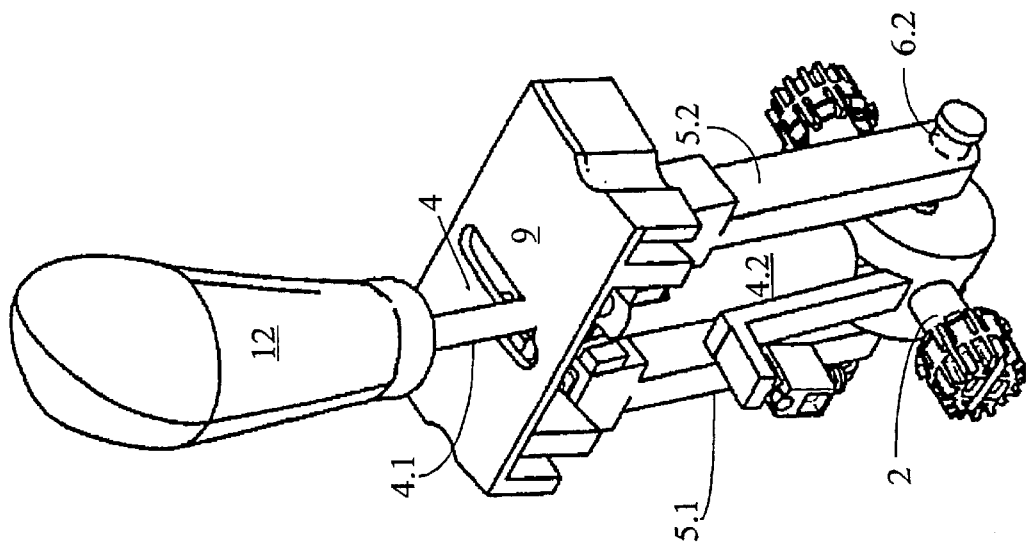
FIG. 4b is a perspective view of the shifting device with the gearshift lever in the automatic shift gate in the drive position.
Figure 4A:
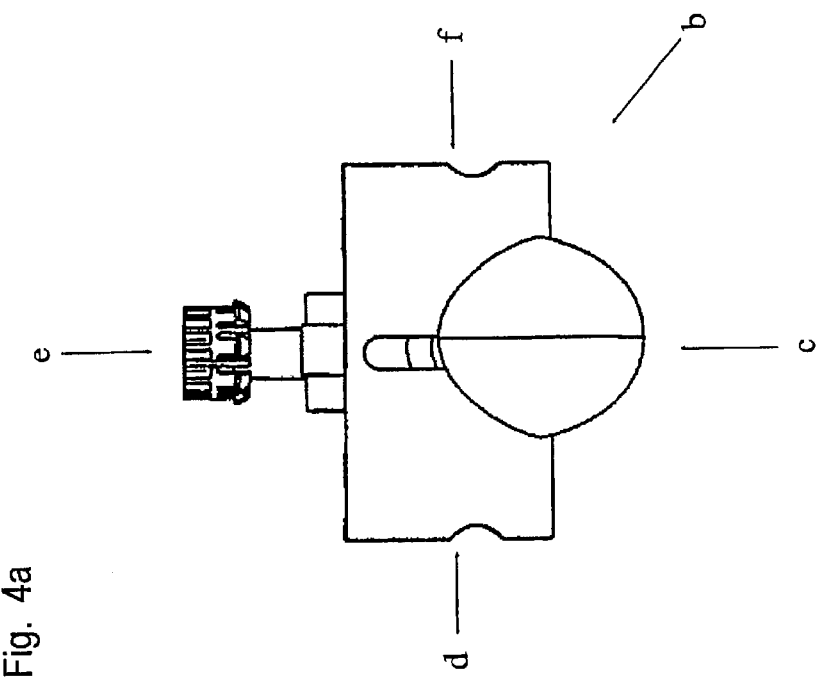
FIG. 4a is a top view of the shifting device with the gearshift lever in the automatic shift gate in the drive position.
Figure 5B:
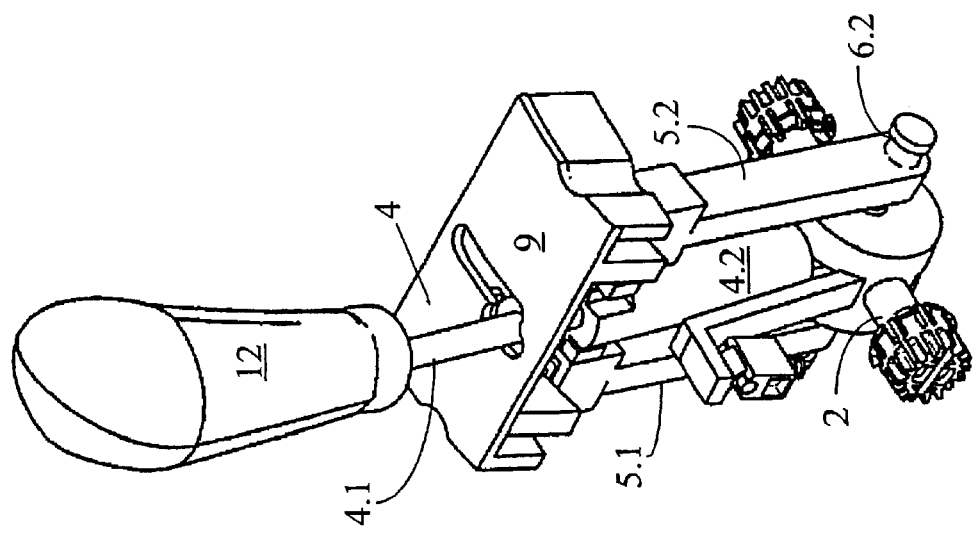
FIG. 5b is a perspective view of the shifting device with the gearshift lever in the middle position in the sequential shift gate.
Figure 5A:
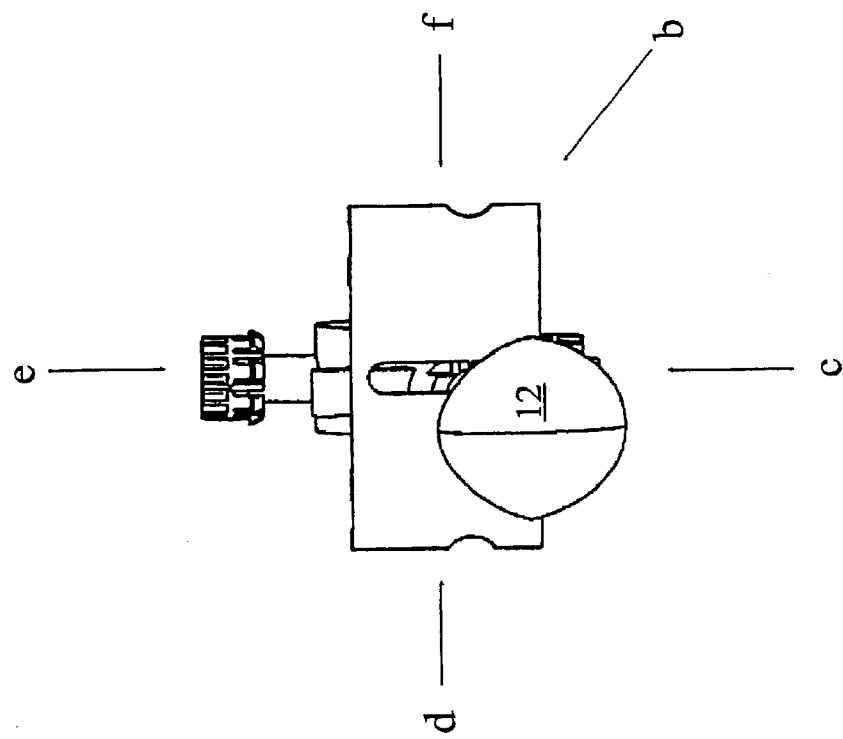
FIG. 5a is a top view of the shifting device with the gearshift lever in the middle position in the sequential shift gate.

FIG. 1b shows an oblique view of the shifting device 1 according to the present invention, while FIGS. 1c through 1f show side views (corresponding to the data in FIG. 1a). The housing belonging to the shifting device is not shown in the figures for the sake of clarity.

The shifting device 1 has a two-part gearshift lever 4, which comprises a first part 4.1 and a second part 4.2, which can be plugged in. The gearshift lever 4 is mounted pivotably around a selector axis 2 and a shift axis 3 at its lower end and is guided in its shift gates by the gear shifting gate 9. Two locking levers 5.1 and 5.2, which are likewise mounted pivotably around a first auxiliary axis 6.1 and a second auxiliary axis 6.2 at their lower ends, are located on the side of the gearshift lever 4. The two auxiliary axes 6.1 and 6.2 are arranged coaxially to the shift axis 3 in this special embodiment, while the selector axis, which makes possible a lateral pivoting of the gearshift lever 4 to the transition between the two shift gates, is located in the same plane as the selector axis 2 and consequently intersects this axis.

The locking levers 5.1 and 5.2 are guided by two different locking devices each such that the locking of the gearshift lever in the different shift positions in the shift gates becomes noticeable.

Lateral pivoting of the gearshift lever around the selector axis 2, which is possible corresponding to the gear shifting gate in an end position of the automatic gate only, will bring about the engagement of the gearshift lever 4 in the first locking lever 5.1 or in the second locking lever 5.2. The first locking lever 5.1 directly engages the gearshift lever 4 by means of the engaging elements 16 when the gearshift lever 4 is in the sequential shift gate, while the connection to the second locking lever 5.2 is abolished at the same time. Conversely, the gearshift lever 4 engages the second locking lever 5.2 by means of engaging elements 16 in the automatic shift gate, while the connection to the first locking lever 5.1 is abolished. The engaging elements 16 are designed in the embodiment being shown as simple tongue-and-groove elements, which are integrated on both sides on the lower first part of the gearshift lever and on the inner sides of the locking levers.

Pivoting of the gearshift lever 4 around the shift axis 3 thus brings about a simultaneous movement of the particular locking lever 5.1 or 5.2 that is connected, so that the corresponding shift commands can be transmitted to the automatic transmission via the locking levers 5.1 and 5.2.

The above description of the FIG. sets 1a–1f analogously also applies to the FIG. sets 2a–2f through 5a–5f, and the individual figure sets differ only by the shown position of the gearshift lever, the gearshift lever being located in the automatic shift gate in FIG. sets 1a–1f through 4a–4f, whereas the FIG. set 5a–5f shows the gearshift lever in the sequential shift gate.

Figure 6:
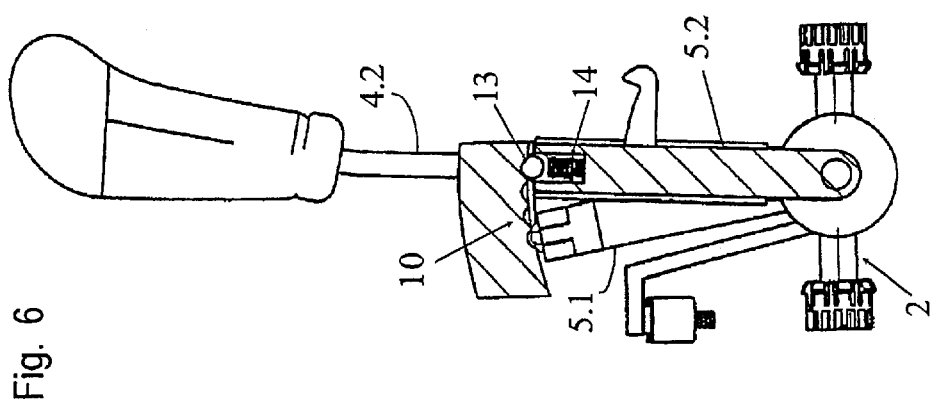
FIG. 6 is a longitudinal sectional view through the shifting device with the view of the locking device of a locking lever.

FIG. 6 shows a longitudinal section through the shifting device according to the present invention in the area of the locking device 10 of the locking lever 5.2. Because the locking device is a locking device for an automatic shift gate, the locking device comprises in this case four locking points for the balls 13, which are pressed by the spring 14 against the contour of the locking device 10.

Figure 7:
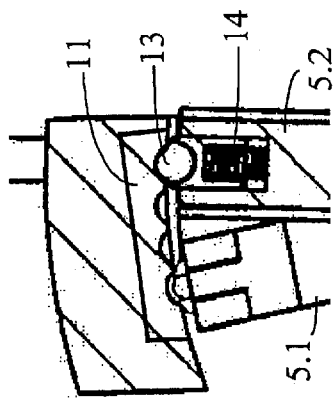
FIG. 7 is a locking device of a locking lever with replaceable block.

As is shown in FIG. 7, this locking device may be arranged according to the present invention on replaceable blocks. It is thus possible, e.g., to switch the locking contours for the automatic gate and the locking contour for the sequential shift gate by replacing the blocks 11, but the gear shifting gate must also be rotated or turned in this case if it has an asymmetric design.

Figure 8:
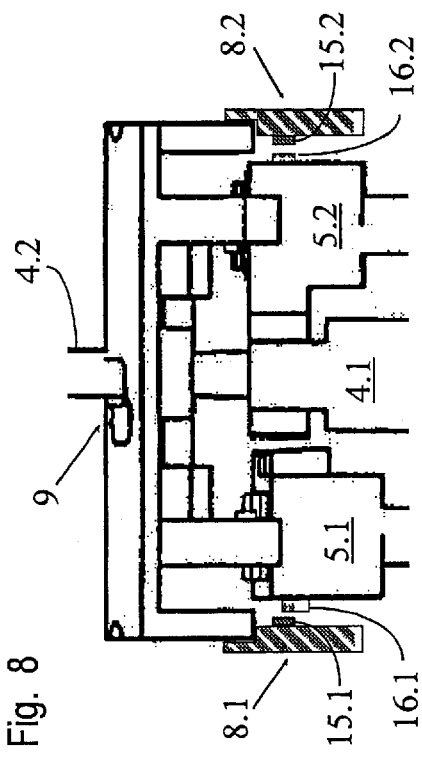
FIG. 8 is a shifting device with laterally arranged printed circuit boards.

FIG. 8 shows an embodiment of the shifting device according to the present invention with a powerless transmission of the shift commands. The powerless transmission of the shift commands takes place here by a corresponding transmission electronic unit, which are arranged on two carriers 8.1 and 8.2, which are designed as printed circuit boards. On their sides facing the locking levers, the carriers 8.1 and 8.2 have sensors 15.1 and 15.2, which can be triggered by the transducers 16.1 and 16.2 arranged on the locking lever side and can trigger a corresponding shift command for the automatic transmission. The carriers 8.1 and 8.2 are designed such that a simple mutual replacement is possible and it is thus possible either to obtain different shift positions in the automatic shift gate or to make a change between the automatic shift gate and the sequential shift gate.

It should also be mentioned that the locking levers 5.1 and 5.2 of the shifting device according to the present invention shown are of an identical design, so that a single shape is sufficient for manufacturing such locking levers.

Figure 9:
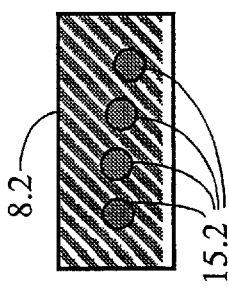
FIG. 9 is a top view of the printed circuit board/carrier with sensors for the automatic shift gate.
Figure 10:
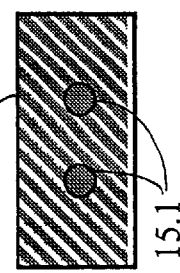
FIG. 10 is a top view of the printed circuit board/carrier for the sequential shift gate.

FIGS. 9 and 10 show a top view of two carriers and printed circuit boards 8.2 and 8.1 for the detection of the position of the gearshift lever in the automatic shift gate and in the sequential shift gate with sensors 15.2 and 15.1. The four sensors 15.2 of the carrier 8.2 are arranged on the arc of a circle, whose center is located on the auxiliary axis of the corresponding locker lever, and the distance between the two corresponds to the locking device of the automatic shift gate, so that a movement of the associated locking lever with a transducer 16.2 arranged there into the shift positions triggers corresponding shift commands to a connected automatic transmission. The four sensors detect the shift positions P, R, N, D on the carrier 8.2 according to FIG. 9. The carrier 8.1 correspondingly has two sensors 15.1, by which the upshifting and downshifting in the sequential shift gate can be detected when the gearshift lever is located in this shift gate and thus engages the locking lever and carries same with its shifting movement. The shape of the carriers is selected according to the present invention such that a mutual replacement is possible on the shifting device, and only the fastening points and their location must be identical.

Figure 11:
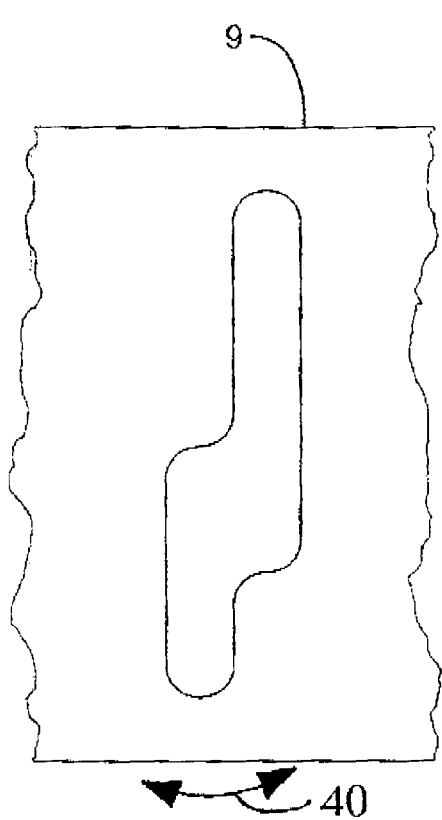
FIG. 11 is a top broken away view of a shift gate in a normal position.
Figure 12:
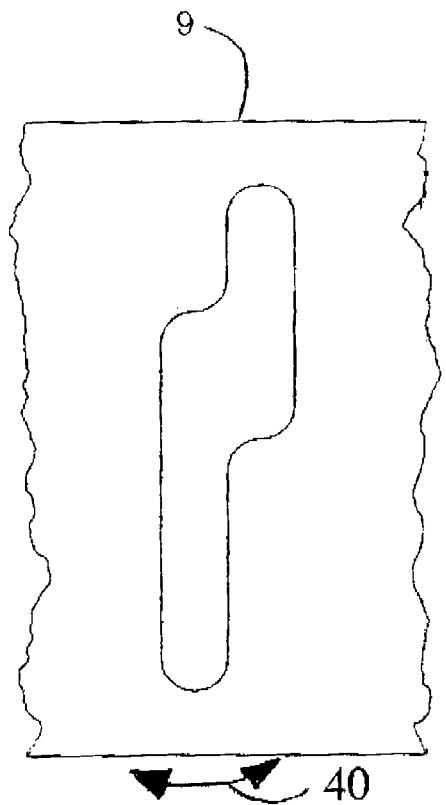
FIG. 12 is the broken away shift gate of FIG. 11 rotated about 180°.

As shown in FIG. 11, the arrangement described above may be used in more than one Position. This is a simple technical measure to turn the gear shifting gate 9 about by 180° as shown by arrow 40. FIG. 11 shows the shift gate 9 in a position shown for example in FIG. 1a and 1b. FIG. 12 shows the same shift gate 9 turned about 180°.

Consequently, the present invention provides, on the whole, a shifting device for transmitting shift commands to an automatic transmission, which makes it possible to use this shifting device using identical components for different vehicles, and large lots of identical components can be manufactured for different vehicles and the necessary logistics is simplified as a result.

It is apparent that the above-mentioned features and the features in the claims may be used not only in the particular combinations described, but also in other combinations or alone, without going beyond the scope of the present invention. While a specific embodiment of the invention has been shown and described in detail to illustrate the application of the principles of the invention, it will be understood that the invention may be embodied otherwise without departing from such principles.

What is claimed is:

1. A shifting device for transmitting shift commands to an automatic transmission of a motor vehicle, the shift device comprising:

a housing with a selector axis and a shift axis arranged at a right angle to said selector axis;

one of an outer right-hand shift gate and an outer left-hand shift gate;

a gearshift lever mounted pivotably in relation to a neutral position within said at least one outer right-hand shift gate and outer left-hand shift gate;

a shift command transmission for transmitting shift commands based on a movement of the gearshift lever to the automatic transmission; and at least two separate locking levers, each of said levers being pivotable around an auxiliary axis, said auxiliary axis being a rigid part of said housing, said at least two said separate locking levers being indirectly or directly engaged by the said gearshift lever.

2. A shifting device in accordance with claim 1 above, wherein said auxiliary axes of said locking levers are arranged such that one of said locking levers, that is engaged and said gearshift lever are pivotable around a common axis line.

3. A shifting device in accordance with claim 1, wherein said shift axis and said selector axis are located in one plane.

4. A shifting device in accordance with claim 1, further comprising a guide that is connected to said housing opposite the corresponding said auxiliary axes, said locking levers extending from said auxiliary axes into said guide.

5. A shifting device in accordance with claim 1, wherein said shift command transmission includes at least two carriers for sensors for the gearshift lever position.

6. A shifting device in accordance with claim 5, wherein said two carriers have a substantially identical design.

7. A shifting device in accordance with claim 5, wherein said carriers comprise printed circuit boards with sensors fastened to them.

8. A shifting device in accordance with claim 1, wherein said gear shifting gate includes a guide receiving said gearshift lever for guiding said gearshift lever.

9. A shifting device in accordance with claim 8, wherein said gear shifting gate is fastened to said shifting device in one of two positions offset by 180°.

10. A shifting device in accordance with claim 1, wherein said gearshift lever comprises two-parts with a first part mounted pivotably around said selector axis and said shift axis and a second part detachably connected to said first part by a plug-type or screw connection.

11. A shifting device in accordance with claim 1, further comprising a locking device, said two locking levers being in contact with said locking device via a spring-loaded ball or roller.

12. A shifting device in accordance with claim 11, wherein said locking device is arranged on separate replaceable blocks and holding devices that are rigid parts of said housing, said holding devices receiving said blocks.

13. A shifting device in accordance with claim 12, wherein said replaceable blocks also have a guide for guiding said locking levers.

14. A shifting device in accordance with claim 12, wherein said replaceable blocks and the holding devices for them, which are rigid parts of the housing, are designed such that said blocks can be mutually replaced.

15. A shifting device in accordance with claim 1, wherein said two locking levers have an identical shape.

16. A shifting device in accordance with claim 1, wherein at least one of said locking levers has an attachment for a cable usable in two directions.

* * * * *